United States Patent
Carobolante

(10) Patent No.: US 6,297,603 B1
(45) Date of Patent: Oct. 2, 2001

(54) CIRCUIT AND METHOD TO AVOID HIGH CURRENT SPIKES IN STATOR WINDINGS

(75) Inventor: Francesco Carobolante, Portola Valley, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 08/202,828

(22) Filed: Feb. 28, 1994

(51) Int. Cl.[7] .................................................. H02K 23/00
(52) U.S. Cl. ........................... 318/254; 318/439; 318/138
(58) Field of Search ................................. 318/609, 254, 318/138, 439

(56) References Cited

U.S. PATENT DOCUMENTS

| | | | |
|---|---|---|---|
| 3,699,989 | * 10/1972 | O'Connor et al. | 318/609 X |
| 4,262,236 | * 4/1981 | Gelenius et al. | 318/254 X |
| 4,319,173 | * 3/1982 | Rhodes | 318/609 |
| 4,472,666 | * 9/1984 | Akeda et al. | 312/254 |
| 4,499,412 | * 2/1985 | Locher et al. | 318/609 X |
| 4,540,926 | * 9/1985 | Kölzer et al. | 312/609 |
| 4,843,288 | * 6/1989 | Volz et al. | 318/599 |
| 4,988,939 | 1/1991 | Reichard et al. | 318/800 |
| 5,191,269 | * 3/1993 | Carobolante | 318/254 |
| 5,221,881 | * 6/1993 | Cameron | 318/254 |

* cited by examiner

Primary Examiner—David S. Martin
(74) Attorney, Agent, or Firm—Steve Bongini; Theodore E. Galanthay; Lisa K. Jorgenson

(57) ABSTRACT

A circuit for minimizing the current spikes in through the stator coils in a brushless dc motor is disclosed. The circuit includes a voltage amplifier for receiving an input signal voltage and a feedback voltage, a compensation circuit for compensating the output of the voltage amplifier, a second voltage amplifier for amplifying the compensated output, a switch for selectively connecting compensated output to the stator coils, and a conductive path for discharging the compensation circuit when the switch is not conducting. The conductive path can be a transistor or a transistor in series with a voltage reference device. The invention reduces the commutation noise and the dynamic power requirement in a brushless direct current motor.

22 Claims, 2 Drawing Sheets

US 6,297,603 B1

CIRCUIT AND METHOD TO AVOID HIGH CURRENT SPIKES IN STATOR WINDINGS

BACKGROUND OF THE INVENTION

1. Field of the Invention

This invention relates to electronic circuits for controlling the power to brushless direct current motors, and more particularly to minimizing current spikes in the stator windings of a brushless direct current motor when the stator coils are switched.

2. Description of the Relevant Art

Although the present invention pertains to polyphase dc motors, in general it finds particular application in conjunction with three phase dc motors, particularly of the brushless, sensorless type which are used for rotating data media, such as found in computer related applications, including hard disk drives, CD ROM drives, floppy disks, and the like. In computer applications, three phase brushless, sensorless dc motors are becoming more popular, due to their reliability, low weight, and accuracy.

Motors of this type can typically be thought of as having a stator with three coils connected in a "Y" configuration, although actually, a larger number of stator coils are usually employed with multiple motor poles. Typically, in such applications, eight pole motors are used having twelve stator windings and four N-S magnetic sets on the rotor, resulting in four electrical cycles per revolution of the rotor. In operation, the coils are energized in a sequences such that a current path is established through two coils of the "Y" with the third coil left floating. The sequences are arranged so that as the current paths are changed, or commutated, one of the coils of the current path is switched to float, and the previously floating coil is switched into the current path. Moreover, the sequence is defined such that when the floating coil is switched into the current path, current will flow in the same direction in the coil which was included in the prior current path. Therefore, six commutation sequences are defined for each electrical cycle in a three phase motor. The method and apparatus for operating a polyphase motor direct current motor is more fully explained in U.S. Pat. No. 5,221,881 and is fully incorporated into this specification by reference.

During the phase commutations of a motor, current ripple has been a problem which results in undesirable acoustical noise produced by the motor and unnecessary wear on the motor. Therefore, an important measurement of the performance of a dc motors is ripple which is the rotational acceleration due to non-constant torque on the motor and is a function of current. The relationship between ripple and current through the stator winding is more fully developed in U.S. Pat. No. 5,191,269 and is fully incorporated into this specification by reference.

Another important measurement of the performance of dc motors is the electrical current demand on the host system and host power supply. It is advantageous to system designers to have dc motors which require low average current demands as well as low dynamic demands. A skilled system designer can lower the total power requirements of the system or increase the system performance with an efficient (low average current demand) dc motor. Conversely, an inefficient dc motor can require a system designer to increase the power supply size or give up other system performance features.

Similarly, the dynamic loading of a dc motor on a power supply needs to be considered by the system designer. Excessive dynamic loading can cause a power supply to "crow bar," which is how a power supply protects itself from what it thinks is a short circuit in the system. Additionally, large dynamic loads add noise to the system. The bigger the dynamic load, the more difficult it is for a system designer to protect the system from the temporary voltage spikes associated with the dynamic load. Therefore, it is advantageous for system designers to have dc motors with low dynamic current requirements.

The current flow in a stator winding is typically controlled by the circuit in FIG. 1. It represents the output stage of the current driver for a brushless dc motor. The problem encountered in this configuration is that when the output stage is turned off by moving switch 30 into the "0" position, the feedback loop 60 is open and the compensation capacitor 20 is thus charged to the output level of the error amplifier 10, even if input Vin is brought to 0 volts, due to the intrinsic offset voltage of the error amplifier. Consequently, when the output stage is turned back on by switching 30 to the "1" position, the current on the output stage is only limited by the stator coil 45 and sense resistor 55 until the loop enters the linear mode of operation. Depending on the value of the compensation capacitor 20, the time required to discharge the capacitor may be significant and therefore the duration of the output current spike may also be significant. This, in turn, creates an excessive current demand on the power supply of the system.

In addition to the unwanted load on the system's power supply, the current spike increases the electrical stress to components by causing them to dissipate additional power. Since these devices are often used in laptop or notebook computers which have limited air ventilation for cooling, any additional power dissipation can result in an increase in operating temperature. It is well known in the art that the reliability of semiconductors is inversely proportional to operating temperature which means that any increase in power dissipation in the power stage of the current drivers for the stator windings can result in reduced reliability.

It is an object of the this invention to decrease the high current spike when enabling current delivery to the stator windings of brushless dc motors.

It is further an object of the invention to decrease the dynamic load to the system's power supply caused by enabling current to the stator coils in a brushless dc circuit.

It is further an object of this invention to decrease the electrical stress to the output stage of the current drivers for a brushless dc motor by minimizing current spikes in the stator windings.

SUMMARY OF THE INVENTION

The invention is a circuit for minimizing the current spikes in the stator coils in a brushless dc motor. The circuit includes means for comparing an input voltage to a feedback voltage, means for integrating the output of said comparator, means for selectively discharging the integrator, a stator drive circuit for driving the stator in response to the integrated output of the comparator; and means for selectively enabling and disabling the stator coil circuit.

DETAILED DESCRIPTION OF THE EMBODIMENT

Figure 1:
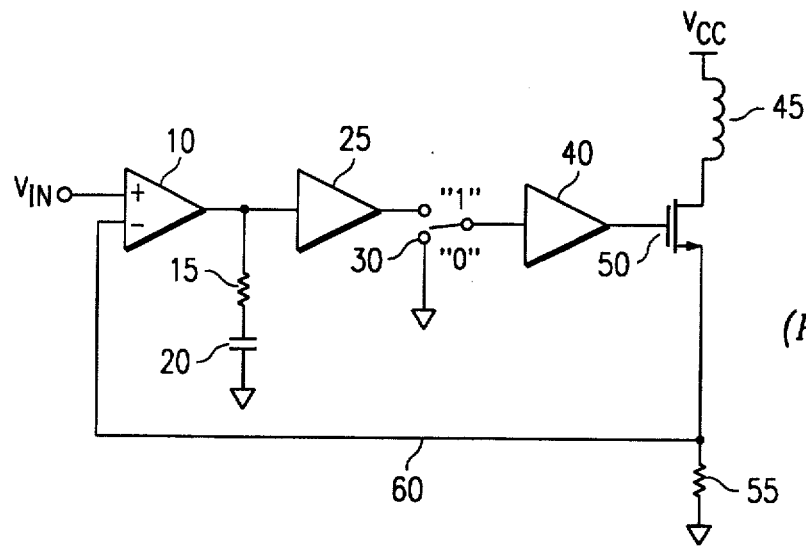
FIG. 1 is a schematic diagram of an output stage of the current driver for a brushless dc motor in the prior art form.
Figure 2:
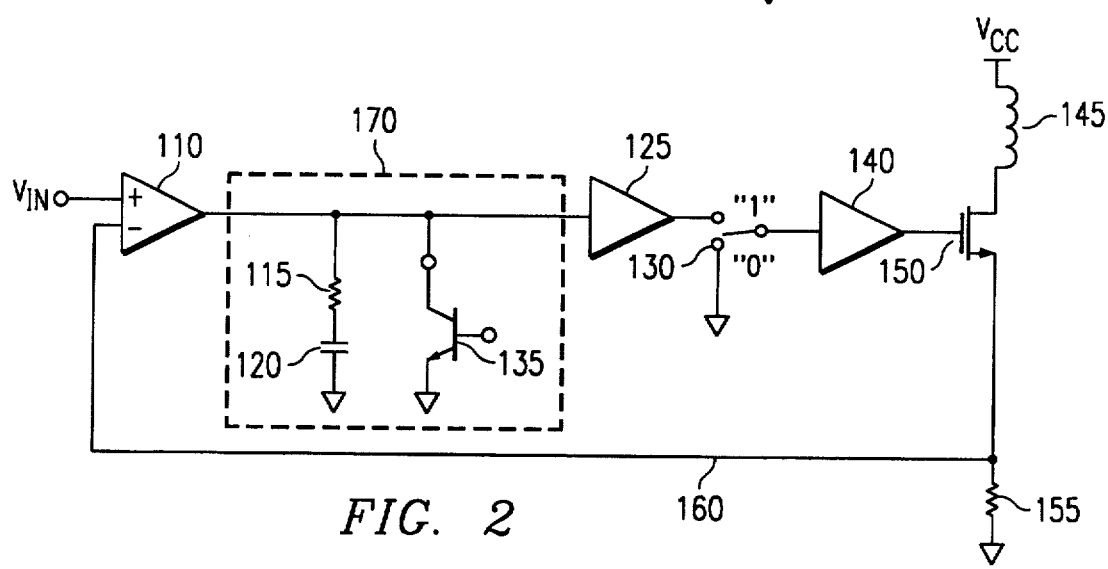
FIG. 2 is a schematic diagram of an output stage of the current driver for a brushless dc motor according to an embodiment of the invention.

FIG. 2 is an output stage of a current driver for a brushless DC motor constructed according to the invention. A voltage comparator 110 receives a voltage input Vin and compares the voltage input to a feedback loop 160 that provides a sense voltage that is related and proportional to the current flow through coil 145. The output of the comparator 110 is applied to a compensation circuit and discharge switch 170 that includes an integrator comprised of resistor 115 and capacitor 120. The series combination is connected to ground. The output voltage from the comparator 110 is converted to a current which stores a charge on top of capacitor 120. As the variations in the output of the comparator are detected, the capacitor 120 is either charged or discharged to apply a compensated voltage to amplifier 125. The output of amplifier 125, when switch 130 is on the "ON" position or the "1" position, is applied to amplifier 140 which drives the field effect transistor 150 and consequently allows current to flow through the inductor 145 and the resistor 155 to ground. When commutation, or "power disable", occurs and it is desired to remove the current flow through the inductor 145, switch 130 is placed in the "0" position and switch 135 is simultaneously placed in the "0" position. This causes the capacitor 120 to discharge to ground through switch 135 and the amplifier 140 to provide a zero voltage output to transistor 150 which would be in the OFF state.

Figure 3:
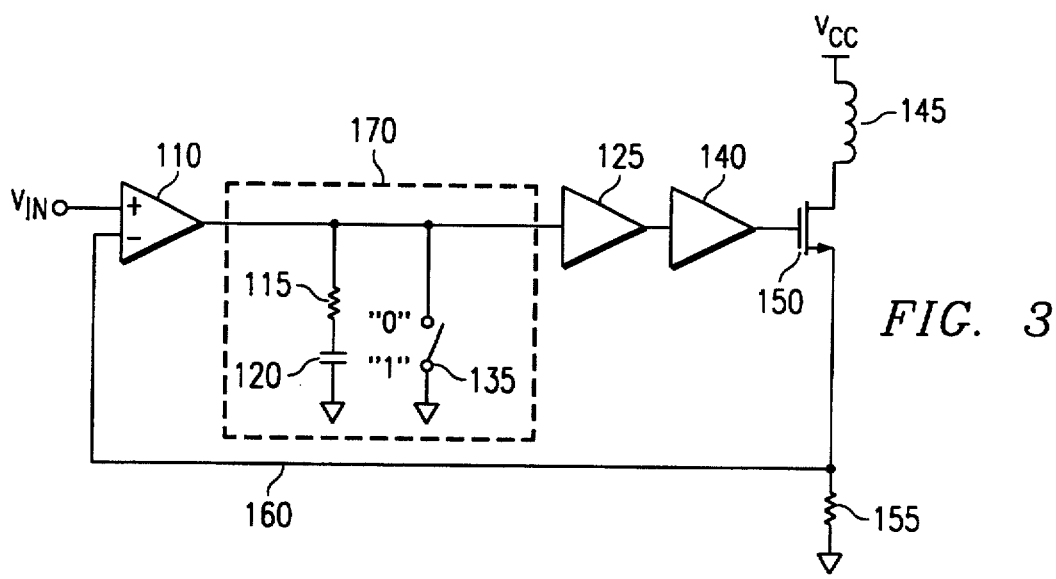
FIG. 3 is a schematic diagram of an output stage of the current driver for a brushless dc motor according to a second embodiment of the invention.

FIG. 3 is very similar to FIG. 2, however the switch 130 has been deleted. In this case, when switch 135 is placed in the "0" position once again the compensation network that includes the series connection of resistor 115 and capacitor 120 is discharged. Simultaneously with the discharge of the compensation network, the amplifier 125 is held to be at the zero state and the output of the amplifier 140 is also held at the zero state keeping FET 150 in the OFF position.

Figure 4:
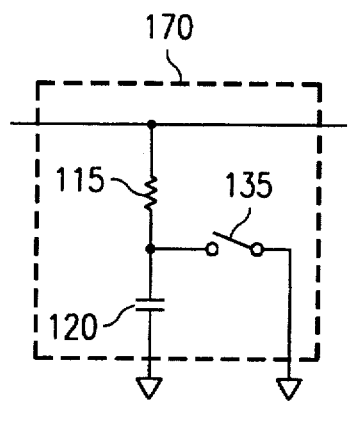
FIG. 4 is a schematic diagram of a third embodiment of the invention.
Figure 6:
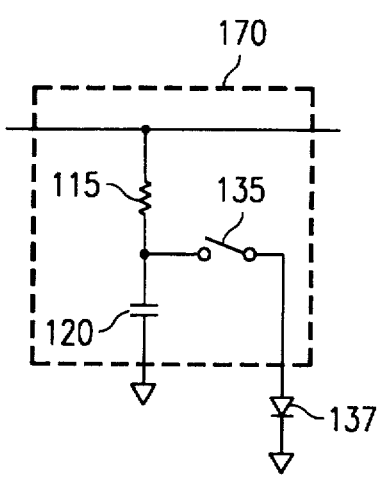
FIG. 6 is a schematic diagram of a fifth embodiment of the invention.

FIG. 4 is an alternate embodiment of the compensation network 170 in which the switch 135 is positioned to more rapidly discharge the capacitor 120 by providing a direct short across the capacitor 120 to ground thus facilitating a more rapid discharge of the capacitor 120. FIG. 6 is the same as FIG. 4 but further comprises a diode in series with the switch. In this embodiment, the diode prevents the capacitor from being totally discharged. This added voltage on the capacitor provides the benefit of requiring less current to charge up the capacitor when the driver circuit is enabled. It is noted that this diode can be added to any of the embodiments in this invention. It is also noted that persons skilled in the art can use other devices or voltage references, such as zener diodes and programmable voltage references, to select the residual voltage desired for a given application.

Figure 5:
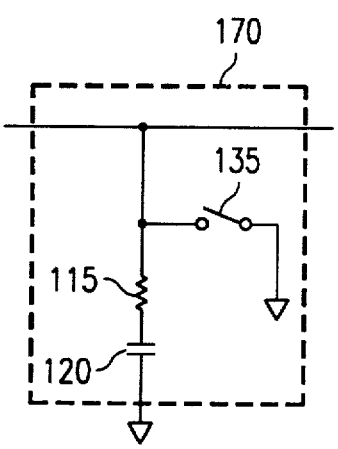
FIG. 5 is a schematic diagram of a forth embodiment of the invention.

FIG. 5 shows yet another embodiment of the compensation network which is envisioned to be used in the embodiment of FIG. 2 wherein the switch 135 is in the ON position connects the top of resistor 115 to the input of amplifier 125 and the output of amplifier 110. When it is in the discharge mode, switch 135 discharges the compensation network that includes resistor 115 and capacitor 120.

It is understood in the art that in FIGS. 2–6 switch 135 can be implemented using a transistor such as a bipolar, field effect transistor, or other combinations of electronic means.

Figure 7:
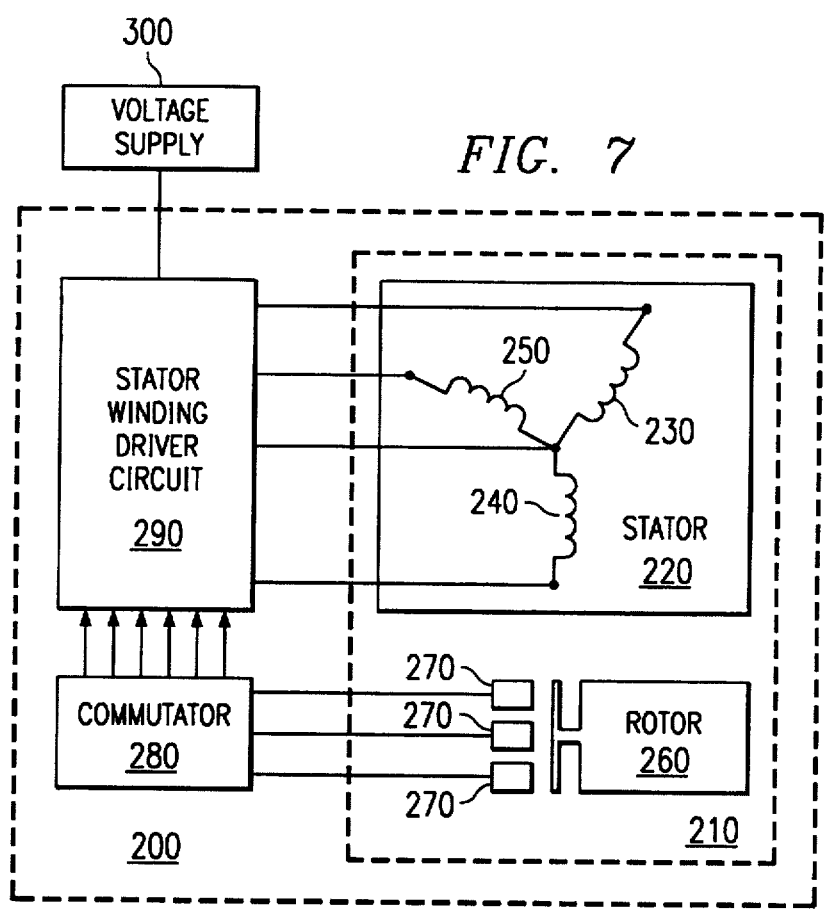
FIG. 7 is a block diagram of a brushless polyphase direct current motor system in which the embodiments of the invention may be employed.

FIG. 7 shows a block diagram of a brushless polyphase direct current motor system in which the embodiments of the invention may be employed. In this diagram, the voltage supply 300 is the systems power supply which supplies the voltage and current necessary to operate the motor system 200. The motor system consists a rotor 260 hall effect sensors 270, a commutator 280, a stator winding driver circuit 290, and a stator 220 which has stator windings 230, 240, and 250. In general, power is supplied by the voltage supply 300 and controlled by the stator winding driver circuit 290 responsive to the commutator 280 which is responsive to hall effect sensors 270 which indicate the position of the rotor 260. U.S. Pat. No. 5,191,269 provides a detailed explanation of a brushless polyphase direct current motor system and is fully incorporated into this specification by reference.

It should be noted that the circuit of the invention can be integrated on a single integrated circuit. Thus, the present invention provides significant cost and reliability advantages over prior approaches.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A circuit for driving current through the stator coils in a motor comprising:
    a first voltage amplifier having a first input for receiving an input signal, having a second input for receiving a feedback signal, and having an output;
    a compensation circuit to compensate the output of said first voltage amplifier;
    a second voltage amplifier for receiving the compensated output from said first voltage amplifier;
    a means for selectively driving said stator coils responsive to the output of said second voltage amplifier; and
    a selectable current path for selectively discharging current from said compensation circuit such that said compensation circuit is discharged when said means for selectively connecting the output is not connected.

2. The circuit of claim 1 wherein said compensation circuit comprises a capacitor.

3. The circuit of claim 1 wherein said compensation circuit comprises a capacitor and a resistor.

4. The circuit of claim 1 wherein said current path comprises a transistor.

5. The circuit of claim 4 wherein said transistor is a bipolar transistor.

6. The circuit of claim 4 wherein said transistor is a MOSFET.

7. The circuit of claim 1 wherein said compensation circuit comprises a capacitor and said current path comprises a transistor.

8. The circuit of claim 1 wherein said selectable current path comprises a transistor in series with a reference voltage means.

9. The circuit of claim 8 wherein said reference voltage means comprises a diode.

10. A circuit for driving current through the stator coils in a brushless dc motor comprising:

comparator means for comparing an input voltage to a feedback voltage and having an output;

means connected to the output of said comparator means for integrating the output of said comparator;

stator coil drive circuit for driving the stator in response to the integrated output of the comparator; and switching means connected between the outout of said comparator means and said stator coil drive circuit for selectively enabling and disabling the stator coil drive circuit; and conducting means for discharging said integration means when said switching means has disabled said stator coil.

11. The circuit of claim 10 wherein said conducting means comprises a transistor.

12. The circuit of claim 10 wherein said conducting means comprises discharging said integration means to a reference voltage means.

13. The circuit of claim 10 wherein said integration means comprises a capacitor and a resistor.

14. The circuit of claim 10 wherein said conducting means comprises a transistor.

15. The circuit of claim 10 wherein said conducting means comprises a transistor in series with voltage reference means.

16. The circuit of claim 10 wherein said integration means comprises a resistor in series with a capacitor and conducting said switching means comprises transistors.

17. A method for minimizing current spikes in the stator windings of a brushless dc motor when the stator coils are switched comprising the steps of:

comparing an input voltage to a feedback voltage, integrating the output of said comparison with an integration circuit, driving a stator coil in response to the integrated output of the comparator, enabling and disabling the stator coil circuit; and discharging said integration circuit when said stator coil is disabled.

18. The method of claim 17 wherein the step of discharging said integration means further comprising the step of switching the charged side of a capacitor to ground.

19. The method of claim 18 wherein the step of discharging the integration means further comprises discharging the integration means to a reference voltage means.

20. A brushless, polyphase, direct-current motor having a rotor and stator coils, and a commutation circuit for providing sequencing signals, and stator coil driver circuit for minimizing current spikes through the stator coils, comprising:

comparator means for comparing an input voltage to a feedback voltage and having an output;

integration means connected to the output of said comparator means for integrating the output of said comparator;

stator coil drive circuit for driving the stator in response to the integrated output of the comparator;

switching means connected between the output of said comparator means and said stator coil drive circuit for selectively enabling and disabling the stator coil drive circuit; and, discharging means for discharging said integration means when stator coil drive circuit is disabled.

21. The direct current motor of claim 19 wherein said discharging means comprises a transistor.

22. The direct current motor of claim 20 wherein said discharging means comprises a transistor in series with a reference voltage means.

\* \* \* \* \*